United States Patent
Awadin et al.

(10) Patent No.: US 10,135,551 B2
(45) Date of Patent: Nov. 20, 2018

(54) METHOD OF IDENTIFYING FAULTY ANTENNA ELEMENTS IN MASSIVE UNIFORM LINEAR ANTENNA ARRAYS

(71) Applicant: QATAR UNIVERSITY, Al Tarfa, Doha (QA)

(72) Inventors: Mohamed Awadin, Plymouth Meeting, PA (US); Ridha Hamila, Doha (QA); Naofal Al-Dhahir, Richardson, TX (US); Waheed U. Bajwa, Piscataway, NJ (US)

(73) Assignee: Qatar University, Al Tarfa Doha (QA)

( * ) Notice: Subject to any disclaimer, the term of this patent is extended or adjusted under 35 U.S.C. 154(b) by 0 days.

(21) Appl. No.: 15/835,254

(22) Filed: Dec. 7, 2017

(65) Prior Publication Data

US 2018/0159638 A1    Jun. 7, 2018

Related U.S. Application Data

(60) Provisional application No. 62/431,134, filed on Dec. 7, 2016.

(51) Int. Cl.
*H04B 17/00* (2015.01)
*H04B 17/17* (2015.01)
(Continued)

(52) U.S. Cl.
CPC ........... *H04B 17/17* (2015.01); *G06F 17/141* (2013.01); *H01Q 21/08* (2013.01); *H04B 7/0456* (2013.01); *H04B 7/0452* (2013.01)

(58) Field of Classification Search
CPC ........... H04L 1/20; H04L 1/24; H04L 41/147; H04B 17/103; H04B 17/18; H04B 17/0057
(Continued)

(56) References Cited

U.S. PATENT DOCUMENTS

| 6,285,330 B1 | 9/2001 | Perl |
| 7,583,229 B2 | 9/2009 | Apostolos et al. |

(Continued)

OTHER PUBLICATIONS

M. D. Migliore, "A Compressed Sensing Approach for Array Diagnosis From a Small Set of Near-Field Measurements," IEEE Transactions on Antennas and Propagation, vol. 59, No. 6, pp. 2127-2133, Jun. 2011.

(Continued)

*Primary Examiner* — Khai Tran
(74) *Attorney, Agent, or Firm* — Richard C. Litman (57) ABSTRACT

The method of identifying faulty antenna elements in massive uniform linear antenna arrays is a compressive sensing-based method that takes advantage of the reduction of the measurement matrix for a uniform linear antenna array to a partial discrete Fourier transform (DTF) matrix, whose rows correspond to the measurements' locations. Particularly, the method of identifying faulty antenna elements in massive uniform linear antenna arrays allows the measurements to be taken to reduce the measurement matrix's worst-case coherence, a factor which affects the detection probability of the defective antenna elements. The method constructs a measurement matrix with fewer distinct inner product values to reduce the worst-case coherence. In an alternative embodiment, the method focuses on bounding the inner product between any pair of measurement matrix columns.

6 Claims, 5 Drawing Sheets

(51) Int. Cl.
*G06F 17/14* (2006.01)
*H04B 7/0456* (2017.01)
*H01Q 21/08* (2006.01)
*H04B 7/0452* (2017.01)

(58) Field of Classification Search
USPC ............ 375/224, 348, 349; 455/226.2, 452.2
See application file for complete search history.

(56) References Cited

U.S. PATENT DOCUMENTS

| | | | | |
|---|---|---|---|---|
| 9,264,123 | B2* | 2/2016 | Das | ........................ H04B 7/0404 |
| 2008/0261535 | A1* | 10/2008 | Weil | ........................ H04B 17/17 |
| | | | | 455/67.11 |
| 2013/0344831 | A1* | 12/2013 | Yuan | ........................ H04W 24/04 |
| | | | | 455/226.2 |

OTHER PUBLICATIONS

G. Oliveri et al., "Reliable Diagnosis of Large Linear Arrays: A Bayesian Compressive Sensing Approach," IEEE Trans. on Anten. and Propag., vol. 60, No. 10, pp. 4627-4636, Oct. 2012.

M. Carlin et al., "Planar Array Diagnosis Through Compressive Sensing: A Preliminary Assessment," in the 8th European Conference on Antennas and Propagation, Apr. 2014, pp. 399-402.

M. Thill et al., "Group Frames With Few Distinct Inner Products and Low Coherence," IEEE Transactions on Signal Processing, vol. 63, No. 19, pp. 5222-5237, Oct. 2015.

L. Applebaum et al., "Deterministic pilot sequences for sparse channel estimation in OFDM systems." Digital signal processing (DSP), 2011 17th international conference on. IEEE, 2011.

* cited by examiner

METHOD OF IDENTIFYING FAULTY ANTENNA ELEMENTS IN MASSIVE UNIFORM LINEAR ANTENNA ARRAYS

CROSS-REFERENCE TO RELATED APPLICATION

This application claims the benefit of U.S. Provisional Patent Application Ser. No. 62/431,134, filed on Dec. 7, 2016.

BACKGROUND

1. Field

The present invention relates to fault detection and identification in antenna arrays, and particularly to a method of identifying faulty antenna elements in massive uniform linear antenna arrays that uses compressive sensing.

2. Description of the Related Art

Very large multiple-input multiple-output (MIMO) systems, commonly referred to as "massive MIMO", have recently gained focus from both academia and industry as one of the key enabling technologies for 5G cellular systems. Massive MIMO offers substantial performance gains over traditional MIMO systems, such as increasing the system throughput by allowing multiple user equipment to be scheduled simultaneously over the same time-frequency resources, as well as enabling transmission of multiple independent data streams to fully exploit all available spatial degrees of freedom. Further, massive MIMO mitigates inter-user interference by creating narrow beams directed to the receiver of interest, and extends the cell radius by focusing the transmitted power in such spatial directions. Additionally, it permits significant power reduction by coherently combining the transmitted or received signals.

To realize these performance gains, several schemes have been proposed to design the precoder and decoder matrices. These schemes each assume the massive MIMO antenna array elements to be fault free. In practice, with large antenna arrays consisting of low-cost antenna elements, the presence of faulty antenna elements with excitation coefficients different from the designed ones typically occur with high probability. Such faults result in significant deviation from the designed array radiation pattern and can lead to severe performance degradation.

Several array diagnosis schemes have been proposed to detect faulty antenna elements and compensate for their detrimental effects on performance. "Backward method array diagnosis" is based on the inverse fast Fourier transform (FFT). To obtain a reliable diagnosis using this scheme, a very large number of measurements must be collected in the measurement plane. Another prior technique, which is based on the "matrix method", was proposed to reconstruct the excitation coefficients. The main drawback of this technique is that the number of measurements has to be bigger than the number of antenna elements in the array, which requires tremendous time to collect measurements for large antenna arrays. A spectral estimation technique, based on the Multiple Signal Classification (MUSIC) method, has also been proposed. This technique is based on singular value decomposition (SVD), which is not practical for large antenna arrays.

To reduce the number of measurements and enhance the reliability of detecting defective antenna elements, array diagnosis schemes based on compressive sensing (CS) have been recently considered. These schemes exploit the fact that only few antenna elements tend to be defective, compared with the total number of elements and, thus, the difference between the excitation coefficients of the array under test and the reference array is a sparse vector that can be recovered using conventional CS recovery algorithms.

In one particular CS-based technique, identifying the faulty antenna elements from near-field measurements (based on CS techniques) was achieved by minimizing the $l_1$ norm. A Bayesian CS recovery approach for linear antenna arrays has also been proposed, as well as a generalization of this technique for planar arrays. Thus far, however, measurement collection procedures for array diagnosis based on CS techniques have not been found for, or applied to, massive uniform linear antenna arrays (ULAs). In the prior proposed CS-based techniques, the measurements were assumed to be uniformly collected and non-uniform sampling was not investigated. Thus, a method of identifying faulty antenna elements in massive uniform linear antenna arrays solving the aforementioned problems is desired.

SUMMARY

The method of identifying faulty antenna elements in massive uniform linear antenna arrays is a compressive sensing-based method that takes advantage of the reduction of the measurement matrix for a uniform linear antenna array to a partial discrete Fourier transform (DTF) matrix, whose rows correspond to the measurements' locations. Particularly, the method of identifying faulty antenna elements in massive uniform linear antenna arrays allows the measurements to be taken to reduce the measurement matrix's worst-case coherence, a factor that affects the detection probability of the defective antenna elements. The method constructs a measurement matrix with fewer distinct inner product values to reduce the worst-case coherence. In an alternative embodiment, the method focuses on bounding the inner product between any pair of measurement matrix columns.

The method of identifying faulty antenna elements in massive uniform linear antenna arrays begins with making N signal measurements over U respective antenna elements of a massive uniform linear antenna array, where N is an integer. The N signal measurements are collected in a measurement vector, v. A sparse U-dimensional coefficient vector c is established, which has k nonzero entries, where k<<U and N<U. The coefficient vector c includes a set of excitation coefficients corresponding to the antenna elements of the massive uniform linear antenna array, where N is a divisor of U−1, such that a value, r, given by r=(U−1)/N is an integer.

A vector $\tilde{c}$ is established as $\tilde{c}=c-c_T$, where $c_T$ is a vector including a set of excitation coefficients corresponding to error-free ones of the antenna elements of the massive uniform linear antenna array. The discrete Fourier transform matrix, A, is given by:

$$A = \begin{bmatrix} 1 & 1 & \cdots & 1 \\ 1 & e^{-j2\pi\frac{1}{U}} & \cdots & e^{-j2\pi\frac{(U-1)}{U}} \\ \vdots & \vdots & \vdots & \vdots \\ 1 & e^{-j2\pi\frac{(N-1)}{U}} & \cdots & e^{-j2\pi\frac{(N-1)(U-1)}{U}} \end{bmatrix}, 0$$

where $j=\sqrt{-1}$.

A cyclic group, $\mathcal{G}$, is established such that $\mathcal{G}=(\mathbb{Z}/U\mathbb{Z})^x$. A unique generator, g, of the cyclic group $\mathcal{G}$ is determined, and a group, $\mathcal{K}$, is constructed as $\mathcal{K}=\{1,k,\ldots,k^{N-1}\}$, where $k=g^r$. A first set of index values is set equal to $\{1,k,\ldots,k^{m-1}\}$ mod U, and rows of the discrete Fourier transform matrix, A, are extracted corresponding to the first set of index values. A measurement matrix, A', is then constructed from the extracted rows. A vector $\tilde{c}$ is calculated from $v-v_T=A'\tilde{c}+w$, where $v_T=A'c_T$. A second set of index values correspond to non-zero entries in the vector $\tilde{c}$. The second set of index values are then correlated with a set of locations of faulty ones of the antenna elements of the massive uniform linear antenna array.

In the alternative embodiment, which is based on bounding the inner product between any pair of measurement matrix columns, an integer R is selected such that R≥2. Next, a set of R coefficients, $\alpha_R$, are established such that $\alpha_R \in \{1,2,\ldots,U-1\}$, where U is prime and $\alpha_R$ is relatively prime with respect to U, and $\{\alpha_i\}_{i=1}^{R-1} \in \{0,2,\ldots,U-1\}$. Here, i is an integer between 1 and R-1, inclusive.

A polynomial, Q(m), is constructed as $Q(m)=\alpha_1 m+\ldots+\alpha_R m^R$, where m is an integer between 1 and M, inclusive, and where M is an integer greater than 1. A multiset of integers, $\mathcal{T}$, is then constructed as $\mathcal{T}=\{Q(m) \mod U: m=1,2,\ldots,M\}$. A first set of index values is equal to a set of unique elements of $\mathcal{T}$. Rows of the discrete Fourier transform matrix, A, are extracted corresponding to the first set of index values. From these, a measurement matrix, A', is then constructed. The vector $\tilde{c}$ is calculated as $v-v_T=A'\tilde{c}+w$, where $v_T=A'c_T$. A second set of index values is determined, corresponding to non-zero entries in the vector $\tilde{c}$. The second set of index values is then correlated with a set of locations of faulty ones of the antenna elements of the massive uniform linear antenna array.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Based on compressive sensing (CS) techniques, a sparse U-dimensional signal vector x with $\kappa$ nonzero entries, such that $\kappa \ll U$, can be efficiently and reliably estimated from N noisy linear measurements, where N<U. The stacked N measurements can be represented by the vector $y \in \mathbb{C}^N$ and written as:

$$y=\Phi x+w, \quad (1)$$

where $\Phi$ is an N×U measurement matrix and w is an N×1 noise vector. An estimate of the sparse vector x can be obtained by solving the following optimization problem:

$$\hat{x} \triangleq \underset{x \in \mathbb{C}^U}{\operatorname{argmin}} \|x\|_0, \quad (2)$$

subject to $\|y-\Phi x\|_2^2 \leq \epsilon$ where $\|x\|_0$ is the $l_0$ norm of the vector x, which counts its nonzero entries, and $\epsilon$ is chosen large enough to bound the measurement noise with high probability.

Recovering the locations of the $\kappa$ nonzero entries of x depends on the characteristics of the measurement matrix $\Phi$. Several metrics have been developed to assess the quality of the measurement matrix to enable stable and reliable recovery of the support of x, such as the restricted isometry property (RIP), average coherence, and worst-case coherence. In the present method, the worst-case coherence is used as a coherence measure between the measurement matrix's columns. The worst-case coherence, $\mu$, is given by:

$$\mu = \max_{i,j:i \neq j} \frac{|\phi_i^H \phi_j|}{\|\phi_i\|_2 \|\phi_j\|_2} \quad (3)$$

where the operators $(.)^H$, $|.|$, and $\|.\|_2$ represent the matrix complex-conjugate transpose, the absolute value of a complex number, and the $l_2$ vector norm, respectively. Further, $\phi_i \in \mathbb{C}^N$ denotes the $i^{th}$ column of the matrix $\Phi$.

The lower bound on the worst-case coherence, commonly known as the Welch bound, is given by:

$$\mu \geq \sqrt{\frac{U-N}{(U-1)N}} \quad (4)$$

with equality if and only if:

$$|\phi_i^H \phi_j| = \sqrt{\frac{U-N}{(U-1)N}} \quad \forall i \neq j.$$

The closer the worst-case coherence of the constructed measurement matrix is to the Welch bound, the more reliable the recovering of the nonzero entries will be.

Considering a linear antenna array made up of U antenna elements located on the x-axis, the position of the $u^{th}$ antenna element is denoted by $x_u$. The excitation coefficient of the $u^{th}$ antenna element is denoted by $c_u$. For $\kappa$ faulty antenna elements with unknown locations, where $\kappa \ll U$, i.e., their excitation coefficients are not equal to the true ones. To detect the faulty antenna elements, N far-field measurements are collected, where the $(n+1)^{th}$ measurement is:

$$v_{n+1} = \sum_{u=1}^{U} c_u \frac{e^{-jkr_{un}} \vec{f}_u(\vec{r}_{un}, \theta_n, \phi_n)}{4\pi r_{un}} + w_n,$$

where $n \in \{0,1, \ldots, N-1\}$, j is the imaginary number, and $k=2\pi/\lambda$ is the wave number, with $\lambda$ being the free-space wavelength. The vector $\vec{f}_u(\vec{r}_{un}, \theta_n, \phi_n)$ is the electric field radiation pattern of the $u^{th}$ antenna element at the $(n+1)^{th}$ measurement point, and $r_{un} = |\vec{r}_{un}| = |\vec{r}_n - \vec{r}_u|$, where $\vec{r}_u$ and $\vec{r}_n$ are the position vectors of the $u^{th}$ antenna element and the $(n+1)^{th}$ measurement point, respectively. The azimuth and elevation angles of the probe at the $(n+1)^{th}$ position are denoted by $\phi_n$ and $90°-\theta_n$, respectively. Further, $w_n$ denotes the measurement noise of the $(n+1)^{th}$ measurement. The noise samples over all of the measurements are assumed to be independent, identically distributed (i.i.d) zero-mean additive white Gaussian noise (AWGN) samples with variance $\sigma_w^2$.

The N measurements are collected in a measurement vector $v \in \mathbb{C}^N$:

$$v = A\, 30\, w \quad (5)$$

where the $(n+1, u)^{th}$ entry of the N×U measurement matrix A is given by:

$$\frac{e^{-jkr_{un}} \vec{f}(\vec{r}_{un}, \theta_n, \phi_n)}{4\pi r_{un}},$$

the U×1 vector c consists of the excitation coefficients of the antenna array elements, i.e., $c = [c_1, \ldots, c_U]^T$ and vector $w = [w_0, \ldots, w_{N-1}]^T$. Denoting the error-free antenna elements' excitation coefficients as $c_T \in \mathbb{C}^M$ and subtracting the ideal radiation pattern at the N measurement positions given by $v_T = Ac_T$ from equation (5) yields:

$$\underbrace{V - V_T}_{\tilde{V}} = A\underbrace{(c - c_T)}_{\tilde{c}} + w, \quad (6)$$

where the indices of the $\kappa$ nonzero entries of $\tilde{c}$ indicate the location of the faulty antenna elements.

For a linear array with isotropic antenna elements, the array factor is considered, rather than the far electric field, which can be written at the $(n+1)^{th}$ measurement position as follows:

$$v_{AF,n+1}^L = \sum_{u=1}^{U} c_u e^{-jkx_u \sin\theta_n \cos\phi_n} + w_n. \quad (7)$$

Without loss of generality, it is assumed that the measurements are collected in the x-z plane, i.e., $\phi_n = 0$, $\forall n = 0, \ldots, N-1$. Thus, the measurement matrix A is:

$$A = \begin{bmatrix} e^{-jkx_1 \sin\theta_0} & e^{-jkx_2 \sin\theta_0} & \ldots & e^{-jkx_U \sin\theta_0} \\ \vdots & \vdots & \vdots & \vdots \\ e^{-jkx_1 \sin\theta_{N-1}} & e^{-jkx_2 \sin\theta_{N-1}} & \ldots & e^{-jkx_U \sin\theta_{N-1}} \end{bmatrix}.$$

Further, the $l_2$ norm of any column of the measurement matrix is equal to $\sqrt{N}$: $\|A(:,i)\| = \sqrt{N}$, $\forall i \in \{1, \ldots, U\}$. After some straightforward manipulation, the inner product between the $u^{th}$ and $q^{th}$ columns of A can be written as:

$$|\langle A(:,u), A(:,q) \rangle| = \left| \sum_{n=0}^{N-1} e^{jk\Delta_{uq} \sin\theta_n \cos\phi_n} \right|. \quad (8)$$

Computing a closed-form expression for the worst-case coherence for a general measurement matrix A is very complicated, thus focus is placed on a uniform linear array (ULA) with inter-element spacing $d_x$, which is of great practical interest. Both $d_x$ and $\theta_n$, $n \in (0, \ldots, N-1)$ can be chosen in this case such that A is constructed from N rows of the discrete Fourier transform (DFT) matrix of size U×U. For example, for $d_x = \lambda$ and $\sin[\theta_n] = n/U$, $n \in \{0, \ldots, N-1\}$, the measurement matrix reduces to the first N rows of the DFT matrix of size U×U, and each row corresponds to a particular measurement as:

$$A = \begin{bmatrix} 1 & 1 & \ldots & 1 \\ 1 & e^{-j2\pi \frac{1}{U}} & \ldots & e^{-j2\pi \frac{(U-1)}{U}} \\ \vdots & \vdots & \vdots & \vdots \\ 1 & e^{-j2\pi \frac{(N-1)}{U}} & \ldots & e^{-j2\pi \frac{(N-1)(U-1)}{U}} \end{bmatrix}. \quad (9)$$

From this point, one may focus on determining the best set of indices out of $$\binom{U}{N}$$

in the U×U DFT matrix to achieve the smallest worst-case coherence. Conducting an exhaustive search over all possible subsets is not feasible, particularly for a large number of antenna array elements with a relatively small number of observations. Thus, below, two procedures are provided for constructing the measurement matrix with low worst-case coherence by judiciously choosing N rows from the U×U DFT matrix.

In the following, N rows are selected out of the full U×U DFT matrix to minimize the worst-case coherence. Here, each row represents a particular measurement angle $\theta_n$. The N rows are determined such that the number of distinct pairwise inner products is reduced from $$\binom{U}{2}$$

to (U−1)/N, as well and ensuring that each such inner product value has the same multiplicity factor. Such a measurement matrix has low worst-case coherence and, in certain cases, the Welch bound is achieved.

For a prime number of antenna elements U, and assuming that N is any divisor of U−1 such that r=(U−1)/N is an integer, the cyclic group $\mathcal{G} =(\mathbb{Z}/U\mathbb{Z})^*$, the multiplicative group of the integers modulo U, has a unique subgroup, denoted by $\mathcal{K}$, of order m consisting of distinct $r^{th}$ powers of the elements of $\mathcal{G}$. In other words, $\mathcal{K} = \{1, k, \ldots, k^{N-1}\}$, where $k=g^r$ and g is the unique generator of $\mathcal{G}$. The measurement matrix constructed from rows of the U×U DFT matrix and indexed by the set $\mathcal{K}$ has at most r distinct inner product values. For example, for U=67 antenna elements and choosing N=11 measurements (i.e., r=66/11=6), the constructed measurement matrix consists of the rows indexed by {1,9,14,15,22,24,25,40,59,62,64} and has at most three distinct inner product values with an equal multiplicity of $(67^2−67)/3=1474$.

Thus, the few distinct inner products measurements procedure begins with the step of finding the unique generator g for $(\mathbb{Z}/U\mathbb{Z})^*$. The next step is to choose the number of measurements N to be any divisor of U−1. The set of rows' indices are given by $\{1, k, \ldots, k^{m-1}\}$ mod U, where $$k = g^{\frac{U-1}{N}}.$$

It should be noted that the measurement matrix in this case achieves the Welch bound if and only if the set $\mathcal{K}$ forms a difference set in $(\mathbb{Z}/U\mathbb{Z})^*$. For example, if r=2 and N−1 is not dividable by 4, then the Welch bound is achieved.

In the above method, the number of measurements, N, is restricted to be one of the factors of U−1. In some cases, N approaches half the number of antenna elements, which is considered beyond the acceptable number of measurements. For example, assuming U=107, then N∈{1,2,53,106}, which is either too few measurements to reliably recover the defective antenna elements or too many measurements.

In order to overcome this drawback, an alternative method is further presented which can be used for any number of measurements. In scenarios where both methods can be used to construct the measurement matrix, the above exhibits smaller worst-case coherence, as will be numerically verified below.

In the alternative method, for prime U, the multiset $\mathcal{T} = \{Q(m) \bmod U: m=1,2,\ldots,M\}$ is constructed, where M is an integer greater than 1 and Q(m) is an R-degree polynomial with R≥2 and coefficients denoted by $\{\alpha_i\}_{i=1}^R$: $Q(m) = \alpha_1 m + \ldots + \alpha_R m^R$. Those coefficients are chosen to be co-prime to U, i.e., $\alpha_R \in \{1, \ldots, U-1\}$, while the other coefficients $\{\alpha_i\}_{i=1}^R \in \{0, 1, \ldots, U-1\}$. The set of row indices corresponds to the unique elements in $\mathcal{T}$. It should be noted that M is chosen big enough such that the multiset $\mathcal{T}$ has N unique elements.

In the alternative polynomial-based measurements procedure, an integer R≥2 is initially selected. Next, $\alpha_R \in \{1,2,\ldots,U-1\}$ is selected such that it is relatively prime to U and $\{\alpha_i\}_{i=1}^{R-1} \in \{0,2,\ldots,U-1\}$. Then, $Q(m) = \alpha_1 m + \ldots + \alpha_R m^R$ is constructed. This is followed by the step of choosing integer M≥1 and forming the multiset of integers $\mathcal{T} = \{Q(m) \bmod U: m=1,2,\ldots,M\}$. Finally, the N rows' indices are selected to be unique elements of $\mathcal{T}$.

In order to evaluate the performance of the above methods, the detection probability is defined as $$P_D = \frac{|\hat{\mathcal{S}} \cap \mathcal{S}|}{\kappa},$$

where κ is the number of defective antenna elements that the CS-based recovery method tries to recover, while $\mathcal{S}$ and $\hat{\mathcal{S}}$ are the sets of true and estimated indices of the defective antenna elements, respectively. The quantity $|\hat{\mathcal{S}} \cap \mathcal{S}|$ determines the number of correctly identified faulty antenna elements. Moreover, the signal to noise ratio (SNR) is defined as $\text{SNR} = (c_T^H c_T)/\sigma_w^2$.

To recover $\tilde{c}$ from equation (6), the orthogonal matching pursuit (OMP) technique is used (a well-known greedy algorithm), which iteratively finds the most correlated column of the measurement matrix A and the corresponding entry in c until κ entries are recovered. Unless stated otherwise, a ULA with inter-element spacing of λ is considered, with the angular space being sampled such that $$\sin\theta_n \in \left\{0, \ldots, \frac{U-1}{U}\right\},$$

∀n∈{0,…,N−1}. The methods given above allow for the selection of the N measurements to reduce the worst-case coherence and improve the reliability of recovering the faulty antenna elements. For purposes of the present evaluation, the number of faulty elements is set to be 4% of the total number of antenna elements and their excitation coefficients are set equal to zero. For simplicity, the excitation coefficients of the fault-free antenna elements are set to one.

Figure 1:
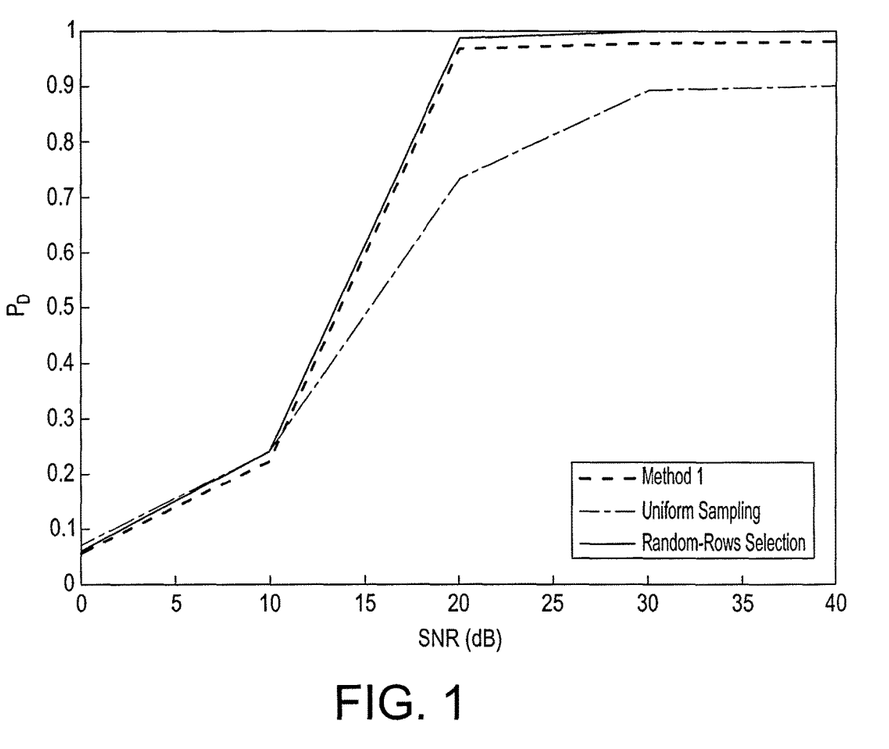
FIG. 1 is a graph showing detection probability as a function of signal-to-noise ratio (SNR) calculated by a method of identifying faulty antenna elements in massive uniform linear antenna arrays and compared against detection probability generated by a uniform sampling method and detection probability generated by a random row selection method.

FIG. 1 shows the detection probability, $P_D$, for a ULA with U=941 antenna elements, where 38 are defective antenna elements and 235 measurements are collected. In FIG. 1, the first method (i.e., the few-distinct-inner-products measurements method, referred to herein as "Method 1") is compared with the generator g=2 and uniform sampling of the elevation angle (i.e., $\theta_n = (2\pi n)/N$, with n∈{0,…,N−1}. The constructed matrix using Method 1 achieves a lower worst-case coherence of μ=0.0717 than the one constructed using uniform sampling, for which μ=0.22. At high SNR, the detection probability using Method 1 increases from 75% to 97%. To further assess the performance of Method 1, the method is also compared with a random measurements collection procedure, where the measurements correspond to a partial DFT matrix with the rows selected uniformly at random, which is known to satisfy near-optimal restricted isometry property (RIP) guarantees. It can be seen in FIG. 1 that the detection probability using Method 1 is close to the performance achieved by random measurements collection.

Figure 2:
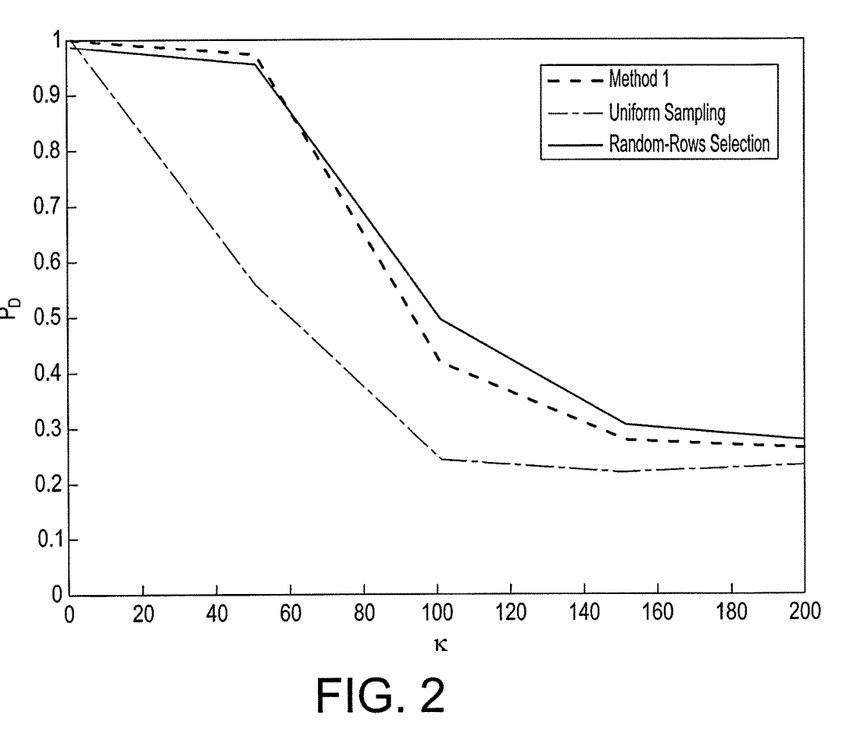
FIG. 2 is a graph showing detection probability as a function of the number of defective antenna elements calculated by the method of identifying faulty antenna elements in massive uniform linear antenna arrays and compared against detection probability generated by the uniform sampling method and detection probability generated by the random row selection method
Figure 3:
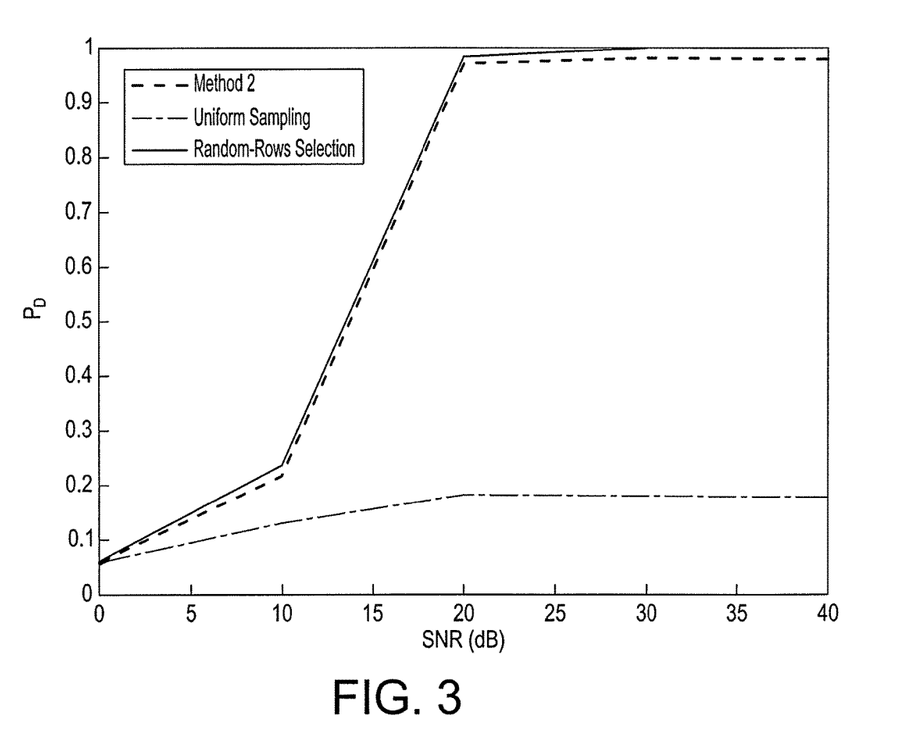
FIG. 3 is a graph showing detection probability as a function of signal-to-noise ratio (SNR) calculated by an alternative embodiment of the method of identifying faulty antenna elements in massive uniform linear antenna arrays and compared against detection probability generated by the uniform sampling method and detection probability generated by the random row selection method.

FIG. 2 shows the detection probability versus the number of defective antenna elements κ. At a detection probability of 90%, Method 1 identifies 58 faulty antenna elements compared with only 14 faulty elements when uniformly-sampled measurements are used, while it approaches the performance of random measurements collection. When the number of measurements, N, is not a divisor of U−1, the second method (i.e., the polynomial-based measurements method, referred to herein as "Method 2") can used to construct the measurement matrix with low μ. In order to examine this, the same antenna array size is considered; i.e., U=941 and N=230, for which (U−1)/N is not integer. For the R-degree polynomial, R=2 is selected, with $\{\alpha_i\}_{i=1}^R = 1$. The constructed measurement matrix exhibits lower worst-case coherence of μ=0.113, compared to uniform elevation angle sampling with μ=0.3073 and it achieves higher detection probability. Further, it gets closer to the near-optimal performance of random measurements collection, as shown in FIG. 3.

Table 1 below shows the worst-case coherence for measurement matrices constructed by Method 1 and Method 2. As shown in Table 1, Method 1 achieves lower worst-case coherence, even reaching the Welch bound in some cases. However, it can only be applied when (U−1)/N is an integer. On the other hand, Method 2 has more parameters to control, such as the polynomial order R and its coefficients $\{\alpha_i\}_{i=1}^{R}$, which gives it greater flexibility for any number of measurements N.

TABLE 1

Worst-case Coherence for Differing ULA Sizes

| (U, N) | Method 1 | Method 2 | Welch Bound |
|---|---|---|---|
| (67, 11) | 0.344 | 0.473 | 0.278 |
| (73, 9) | 0.314 | 0.540 | 0.314 |
| (941, 235) | 0.072 | 0.102 | 0.057 |

Figure 4A:
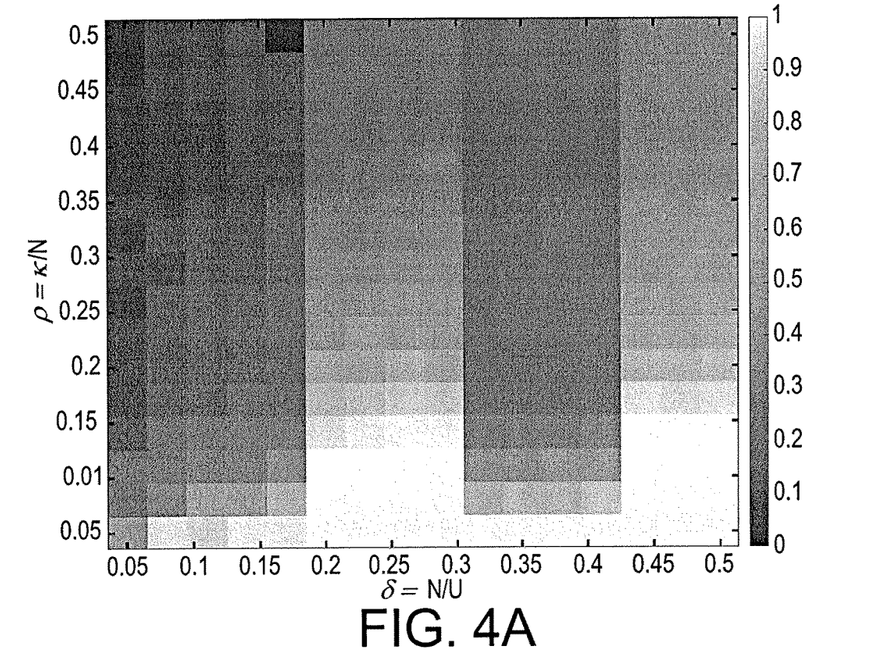
FIG. 4A is a plot of detection probability generated by the uniform sampling method for differing values of normalized indeterminacy and sparsity level.
Figure 4B:
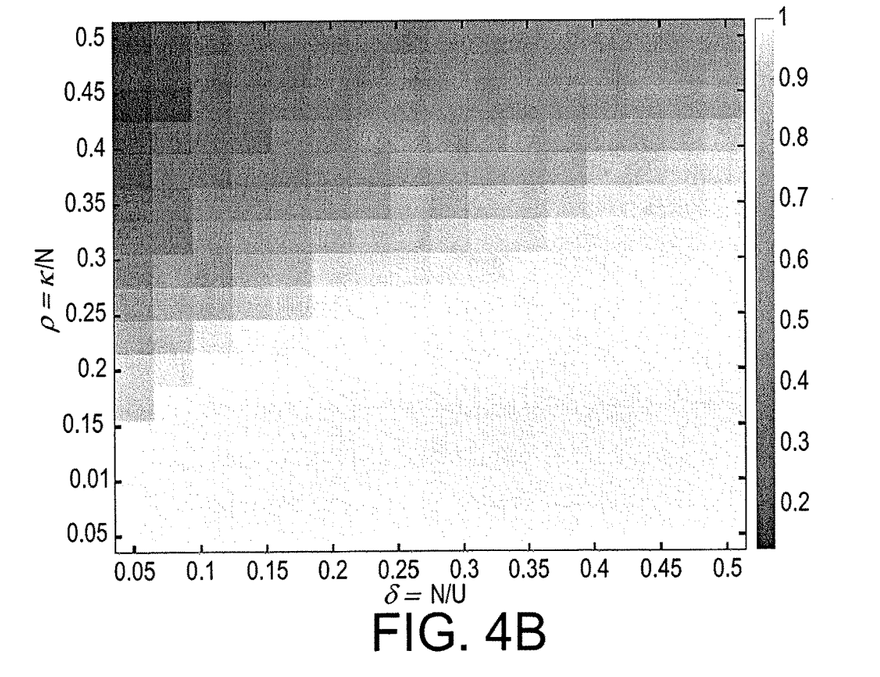
FIG. 4B is a plot of detection probability generated by the alternative embodiment of the method of identifying faulty antenna elements in massive uniform linear antenna arrays for differing values of normalized indeterminacy and sparsity level.
Figure 4C:
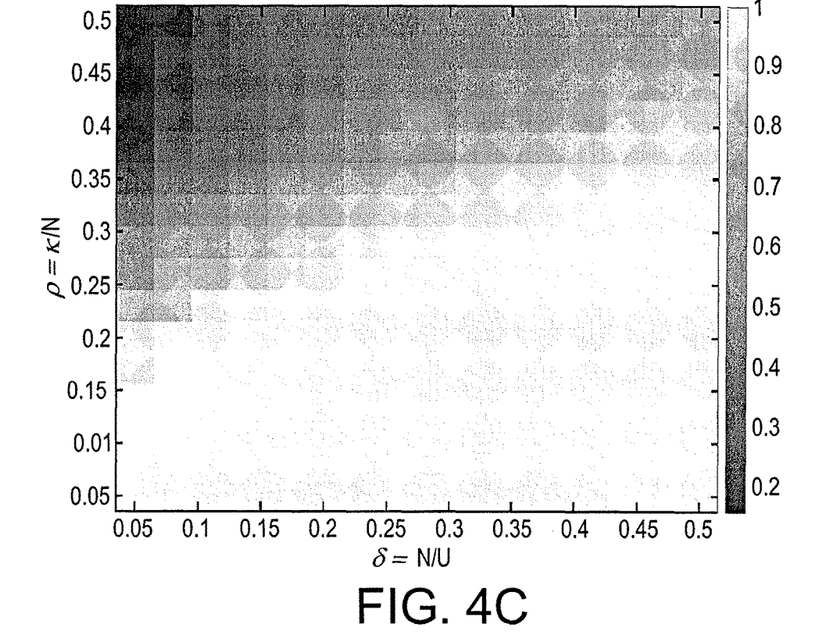
FIG. 4C is a plot of detection probability generated by the random row selection method for differing values of normalized indeterminacy and sparsity level.

In FIGS. 4A-4C, the detection probability is quantified for different δ=N/U and ρ=κ/N, where δ and ρ are the normalized indeterminacy and sparsity levels. FIGS. 4A-4C may be referred to as detection probability phase transition figures (PTFs), since they show a transition, from the upper-left corner (representing recovery failure) to the lower-right corner (representing successful recovery in a noise-free scenario). As shown in FIG. 4A, uniform sampling results in poor performance at high sparsity levels. On the other hand, 4B shows a similar detection probability region for Method 2 as that of the random measurements collection procedure, shown in FIG. 4C. It should be noted that the detection probability PTF for Method 1 would be less informative because only a few points can be generated, since the number of measurements has to be a divisor of N−1, which restricts ρ and δ to specific values.

In the microwave antenna art, diagnosis is a necessary step prior to a beam's construction and scheduling multiple devices over the same time/frequency resources, which is known as MU-MIMO. For example, in fifth generation (5G) wireless communications, new radio (NR), its next generation node B (gNB) will be equipped with massive antenna arrays capable of creating narrow beams to overcome high pathless propagation due to operating in the mm wave frequency band. As 3GPP standardization progresses, an increasing effort is being made to transfer all the control channels and signals from being based on non-precoded transmission in LTE to becoming based on narrow beam transmission. The following are two applications for the above-described methods of antenna array diagnosis.

For NR-paging, in contrast to the paging procedure in LTE, in which the paging message is sent everywhere in the serving area, in NR, the paging message is sent over narrow beams in particular directions to compensate for high path losses. To cover the whole serving area, a beam sweeping over the horizontal and vertical dimensions needs to be done. For accurate beam sweeping, the gNB needs to know the faulty antenna elements to adjust the precoder matrices and compensate for them. Therefore, the gNB's antenna array has to be diagnosed in a frequent manner to allow the gNB to calibrate for the faulty antenna elements.

For MU-MIMO, in NR, there is a trend to schedule a greater number of UEs compared with LTE. With such a trend and higher numbers that make the subcarrier spacing reach to 240 kHz, more complicated channel state information (CSI) feedback is proposed. Specifically, the UEs can feedback the indices of the strong beams and the combination coefficients that they prefer to receive the signal on, or even provide the covariance matrices of the channel matrix. For this goal, the gNB sends a precoded channel state information-reference signal (CSI-RS) over different beams. Such beam construction procedures need the gNB to apply proper weighting coefficients and compensate for any faulty antenna elements, which cannot be realized without reliable diagnosis algorithms.

Figure 5:
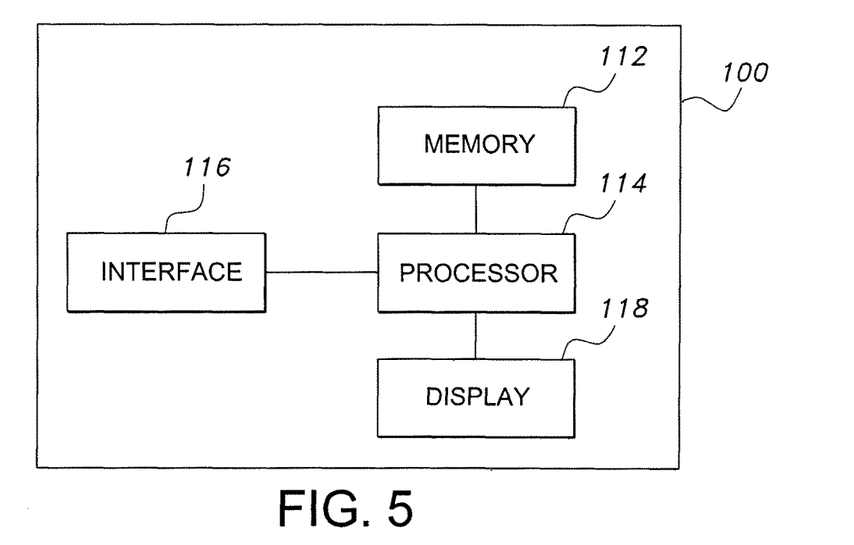
FIG. 5 is a block diagram showing system components for implementing the method of identifying faulty antenna elements in massive uniform linear antenna arrays.

It should be understood that the calculations may be performed by any suitable computer system, such as that diagrammatically shown in FIG. 5. Data is entered into system 100 via any suitable type of user interface 116, and may be stored in memory 112, which may be any suitable type of computer readable and programmable memory and is preferably a non-transitory, computer readable storage medium. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

It is to be understood that the method of identifying faulty antenna elements in massive uniform linear antenna arrays is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of identifying faulty antenna elements in massive uniform linear antenna arrays, comprising the steps of:

making N signal measurements over N respective antenna elements of a massive uniform linear antenna array, wherein N is an integer;

collecting the N signal measurements in a measurement vector, v;

establishing a sparse U-dimensional coefficient vector c having k nonzero entries, wherein κ<<U and N<U, where the coefficient vector c includes a set of excitation coefficients corresponding to the antenna elements of the massive uniform linear antenna array;

establishing a vector $\tilde{c}$ as $\tilde{c}=c-c_T$, where $c_T$ is a vector including a set of excitation coefficients corresponding to error-free ones of the antenna elements of the massive uniform linear antenna array;

constructing a discrete Fourier transform matrix, A, as:

$$A = \begin{bmatrix} 1 & 1 & \ldots & 1 \\ 1 & e^{-j2\pi\frac{1}{U}} & \ldots & e^{-j2\pi\frac{(U-1)}{U}} \\ \vdots & \vdots & \vdots & \vdots \\ 1 & e^{-j2\pi\frac{(N-1)}{U}} & \ldots & e^{-j2\pi\frac{(N-1)(U-1)}{U}} \end{bmatrix}, \text{ where } j = \sqrt{-1};$$

selecting an integer R such that R≥2;

selecting a set of R coefficients, $\alpha_R$, such that $\alpha_R \in \{1,2,\ldots,U-1\}$, where U is prime and $\alpha_R$ is relatively prime with respect to U, and $\{\alpha_i\}_{i=1}^{R-1} \in \{0,2,\ldots,U-1\}$, where i is an integer between 1 and R-1, inclusive;

constructing a polynomial Q(m) as $Q(m) = \alpha_1 m + \ldots + \alpha_R m^R$, where m is an integer between 1 and M, inclusive, where M is an integer greater than 1;

constructing a multiset of integers, $\mathcal{T}$, as $\mathcal{T} = \{Q(m) \bmod U: m=1,2,\ldots,M\}$;

finding a set of unique elements of $\mathcal{T}$;

setting a first set of index values equal to the set of unique elements of $\mathcal{T}$;

extracting rows of the discrete Fourier transform matrix, A, corresponding to the first set of index values and constructing a measurement matrix, A', from the extracted rows;

calculating the vector $\tilde{c}$ as $v-v_T=A'\tilde{c}+w$, where $v_T=A'c_T$;

determining a second set of index values corresponding to non-zero entries in the vector $\tilde{c}$; and correlating the second set of index values with a set of locations of faulty ones of the antenna elements of the massive uniform linear antenna array.

2. The method of identifying faulty antenna elements according to claim 1, further comprising the step of adjusting precoders and compensating for the faulty antenna elements in the massive uniform linear antenna array located by correlating the second set of index values in a 5th generation new radio (NR) environment to enable accurate beam sweeping for NR paging.

3. The method of identifying faulty antenna elements according to claim 1, further comprising the step of weighting coefficients and compensating for the faulty antenna elements in the massive uniform linear antenna array located by correlating the second set of index values in a 5th generation new radio (NR) environment to enable transmission of precoded channel state information references signals (CSI_RS) over different beams.

4. A method of identifying faulty antenna elements in massive uniform linear antenna arrays, comprising the steps of:

making N signal measurements over N respective antenna elements of a massive uniform linear antenna array, wherein N is an integer;

collecting the N signal measurements in a measurement vector, v;

establishing a sparse U-dimensional coefficient vector c having κ nonzero entries, wherein κ<<U and N<U, where the coefficient vector c includes a set of excitation coefficients corresponding to the antenna elements of the massive uniform linear antenna array, wherein N is a divisor of U-1, such that a value, r, given by r=(U-1)/N is an integer;

establishing a vector $\tilde{c}$ as $\tilde{c}=c-c_T$, where $c_T$ is a vector including a set of excitation coefficients corresponding to error-free ones of the antenna elements of the massive uniform linear antenna array;

constructing a discrete Fourier transform matrix, A, as:

$$A = \begin{bmatrix} 1 & 1 & \ldots & 1 \\ 1 & e^{-j2\pi\frac{1}{U}} & \ldots & e^{-j2\pi\frac{(U-1)}{U}} \\ \vdots & \vdots & \vdots & \vdots \\ 1 & e^{-j2\pi\frac{(N-1)}{U}} & \ldots & e^{-j2\pi\frac{(N-1)(U-1)}{U}} \end{bmatrix}, \text{ where } j = \sqrt{-1};$$

establishing a cyclic group, $\mathcal{G}$, as $\mathcal{G}=(\mathbb{Z}/U\mathbb{Z})^\times$;

determining a unique generator, g, of the cyclic group $\mathcal{G}$;

constructing a group, $\mathcal{K}$, as $\mathcal{K}=\{1,k,\ldots,k^{N-1}\}$, where $k=g^r$;

setting a first set of index values equal to $\{1,k,\ldots,k^{m-1}\} \bmod U$;

extracting rows of the discrete Fourier transform matrix, A, corresponding to the first set of index values and constructing a measurement matrix, A', from the extracted rows;

calculating the vector $\tilde{c}$ as $v-v_T=A'\tilde{c}+w$, where $v_T=A'c_T$;

determining a second set of index values corresponding to non-zero entries in the vector $\tilde{c}$; and correlating the second set of index values with a set of locations of faulty ones of the antenna elements of the massive uniform linear antenna array.

5. The method of identifying faulty antenna elements according to claim 4, further comprising the step of adjusting precoders and compensating for the faulty antenna elements in the massive uniform linear antenna array located by correlating the second set of index values in a 5th generation new radio (NR) environment to enable accurate beam sweeping for NR paging.

6. The method of identifying faulty antenna elements according to claim 4, further comprising the step of weighting coefficients and compensating for the faulty antenna elements in the massive uniform linear antenna array located by correlating the second set of index values in a 5th generation new radio (NR) environment to enable transmission of precoded channel state information references signals (CSI_RS) over different beams.

* * * * *